(12) United States Patent
Denenberg et al.

(10) Patent No.: US 7,158,936 B2
(45) Date of Patent: Jan. 2, 2007

(54) METHOD AND SYSTEM FOR PROVIDING A VOICE APPLICATION BOOKMARK

(75) Inventors: Lawrence A. Denenberg, Brookline, MA (US); C. Steven Briggs, Kingston, NH (US)

(73) Assignee: Comverse, Inc., Wakefield, MA (US)

( * ) Notice: Subject to any disclaimer, the term of this patent is extended or adjusted under 35 U.S.C. 154(b) by 401 days.

(21) Appl. No.: 10/029,621

(22) Filed: Nov. 1, 2001

(65) Prior Publication Data

US 2003/0088422 A1    May 8, 2003

(51) Int. Cl.
G10L 11/00    (2006.01)
H04M 1/64    (2006.01)

(52) U.S. Cl. ............... 704/270.1; 704/270; 379/88.01; 379/88.17

(58) Field of Classification Search .. 379/88.16–88.18; 704/270.1, 275
See application file for complete search history.

(56) References Cited

U.S. PATENT DOCUMENTS

| | | | |
|---|---|---|---|
| 5,592,538 A * | 1/1997 | Kosowsky et al. ...... | 379/93.08 |
| 5,873,064 A * | 2/1999 | De Armas et al. ...... | 704/275 |
| 5,895,471 A * | 4/1999 | King et al. ............... | 707/104.1 |
| 6,195,417 B1 | 2/2001 | Dans ........................ | 379/67.1 |
| 6,370,238 B1 * | 4/2002 | Sansone et al. .......... | 379/88.23 |
| 6,535,912 B1 * | 3/2003 | Anupam et al. ............ | 709/217 |
| 6,594,348 B1 * | 7/2003 | Bjurstrom et al. ........ | 379/88.13 |
| 6,594,484 B1 * | 7/2003 | Hitchings, Jr. ............ | 455/414.1 |
| 6,775,358 B1 * | 8/2004 | Breitenbach et al. .... | 379/88.13 |
| 6,985,865 B1 * | 1/2006 | Packingham et al. ....... | 704/275 |
| 7,028,306 B1 * | 4/2006 | Boloker et al. ............. | 719/310 |
| 2002/0054090 A1 * | 5/2002 | Silva et al. ................. | 345/747 |
| 2002/0146015 A1 * | 10/2002 | Bryan et al. ................ | 370/401 |

OTHER PUBLICATIONS

Berners-Lee et al., "Uniform Resource Identifiers (URI): Generic Syntax", RFC 2396, Aug. 1998, available at : http://www.ietf.org/rfc/rfc2396.txt.*

* cited by examiner

Primary Examiner—David Hudspeth
Assistant Examiner—Brian L. Albertalli
(74) Attorney, Agent, or Firm—Mintz, Levin, Cohn, Ferris, Glovsky and Popeo, P.C.

(57) ABSTRACT

A method for providing a bookmark in a voice application includes presenting the voice application to a user, allowing the user to access the voice application and provide vocal input to the voice application, creating, upon a user request, a bookmark to a location in the voice application in accordance with vocal input provided to the voice application, and providing the user with access to the bookmark in the voice application in order to return to the bookmarked location.

34 Claims, 9 Drawing Sheets

METHOD AND SYSTEM FOR PROVIDING A VOICE APPLICATION BOOKMARK

FIELD OF THE INVENTION

The present application relates generally to voice software application systems. More specifically, it relates to providing a bookmark in a voice software application.

BACKGROUND OF THE INVENTION

In a visual user interface, such as a web browser, a user can place a "bookmark" at a point within a web based application to allow the user to later return to that point in the application. Through selecting the bookmark, the user can return to a specific web page in that application that the user previously selected. However, a web bookmark may return the user to the beginning of the page, not a specific point on the page. Usually, it is sufficient for the browser to return the user to the beginning of web page because an entire web page is typically displayed at once.

In a voice based application, such as an application based on VoiceXML, however, a single location cannot be bookmarked. This is because a VoiceXML page may be static or dynamically generated, and it typically consists of a tree of dialogues, each typically asking a question and receiving an answer that determines the next dialogue. The address of the page always starts dialogue at a predetermined point, but the user may wish to bookmark a different point within the dialogue.

In one example, a VoiceXML based voice application provides a horoscope service. It begins by saying "Welcome to XYZ Horoscope Service. If you know your sign, say it; otherwise say 'Don't know.'" If the user now says "Don't know" the dialogue might proceed as follows:

| | |
|---|---|
| Horoscope Service: | "Please say your birth month." |
| User: | "December" |
| Horoscope Service: | "On what day in December were you born?" |
| User: | "6" |
| Horoscope Service: | "Your sign is Sagittarius. Here is your horoscope for today." |

At this point the system selects the appropriate horoscope and plays it for the user.

In the above example, if the user instructed the browser to place a bookmark, a prior art system would create a bookmark that brings the user to the beginning of the VoiceXML page that says "Welcome to the XYZ Horoscope Service" because the browser saves only the URL of the page. This may not be desirable if the user was expecting to only hear his horoscope.

SUMMARY OF THE INVENTION

A method and system for providing a bookmark in a voice application is provided. The method generally includes allowing a user to access the voice application and provide input to the voice application; creating, upon a user request, a bookmark to a location in the voice application; and providing the user with access to the bookmarked location in the voice application in order to return to the bookmarked location. In accordance with the invention, creating a bookmark can include saving a pointer to the voice application; and saving a representation of each input or response by the user to the voice application up to the bookmarked location in the voice application, while providing the user with access to the bookmark location can include using the pointer to access the voice application; and replaying the representation of the interactions to progress through the voice application substantially up to the bookmarked location. In accordance with the invention, creating a bookmark can include saving a modified representation of the voice application that includes substantially all results of the vocal inputs up to the bookmarked location, while providing the user with access to the bookmark location can include executing the modified representation of the voice application. Embodiments of the invention allow a user to bookmark a location in a voice application such that the user can easily return to substantially the same point in the voice application.

In accordance with an embodiment of the present invention, the voice browser can save not only a URL, but the interaction that the URL invokes. In the example above, the browser would save not only the URL of the Horoscope Service, but also the responses "Don't know," "December," and "6." Whenever the user returns to the bookmark, these three responses can be "replayed" to the VoiceXML application by the browser, preferably without any interaction from the user. Preferably, the user doesn't hear these three exchanges between the browser and the VoiceXML page when the user is provided with the bookmarked location. In accordance with another embodiment of the invention, the system can also save a modified representation of the voice page itself.

DETAILED DESCRIPTION OF THE INVENTION

Figure 1:
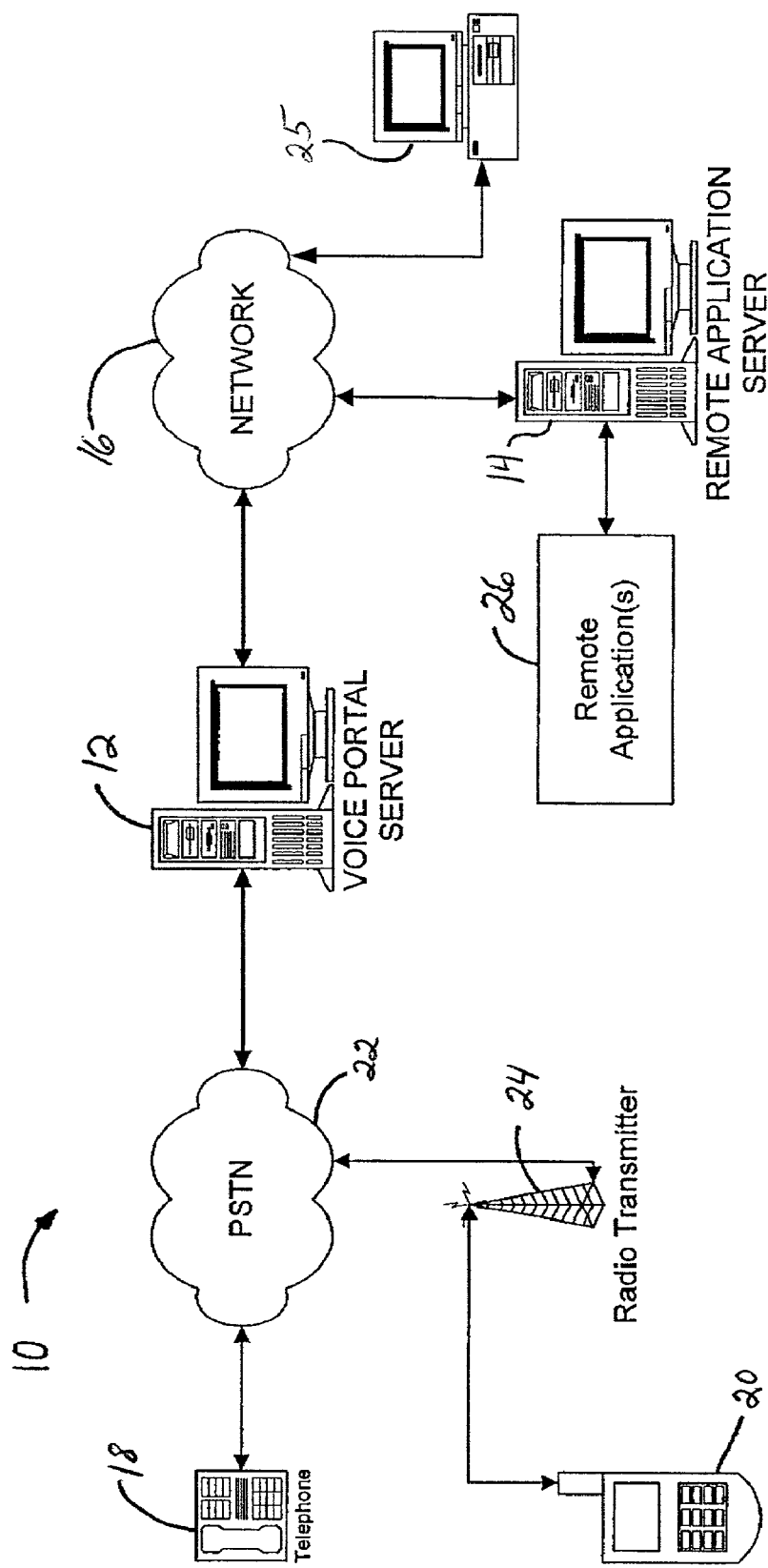
FIG. 1 is a block diagram of the system for providing a bookmark in a voice application.

FIG. 1 shows a view of a voice portal system 10 in accordance with the present invention. The system 10 includes a voice portal server 12 coupled to one or more remote application servers 14 via a network 16, such as the Internet, and coupled to one or more terminals, such as a telephone 18 and a mobile telephone 20 via a network 22, such as a public switched telephone network (PSTN). The mobile telephone 20 can connect to the network 22 through a wireless network connection 24, such as a radio transmitter. A computer 25 can be connected to the voice portal server 12 through network 16 such that it can communicate with server 12, for example, through the use of voice over IP (VoIP). The remote application server 14 is adapted for storing one or more remote applications 26 in a storage device (not shown). The remote application 26 can be any application that a user can interact with using voice, either directly or over a network. The remote application 26 can operate using any code that will allow a user to provide vocal input to the remote application, such as, but not limited to VoiceXML code.

The voice portal server 12 can be a computer based application server based upon, for example, the Windows NT or 2000 operating systems from Microsoft Corp. of Redmond, Wash., the Unix operating system from Sun Microsystems of Palo Alto, Calif. or the LINUX operating system from, for example, Red Hat, Inc. of Durham, N.C.

The remote application server 14 can be a computer based web or application server based upon, for example, the Windows NT or 2000 operating systems from Microsoft Corp. of Redmond, Wash., the Unix operating system from Sun Microsystems of Palo Alto, Calif. or the LINUX operating system from for example, Red Hat, Inc. of Durham, N.C. The web server can be based upon Microsoft's Internet Information Server platform or, for example, the Apache web server platform available from the Apache Software Foundation of Forest Hill, Md.

The network 16 can be a public network such as the Internet or a private network. Alternatively, the voice portal server 12 and the remote application server 14 can be separate applications that are executed on the same physical server or cluster of servers and communicate with each other over an internal data connection. It is not necessary for the invention that voice portal server 12 and the remote application server 14 be connected via a network, it is only necessary that they are able to communicate with each other.

Figure 2:
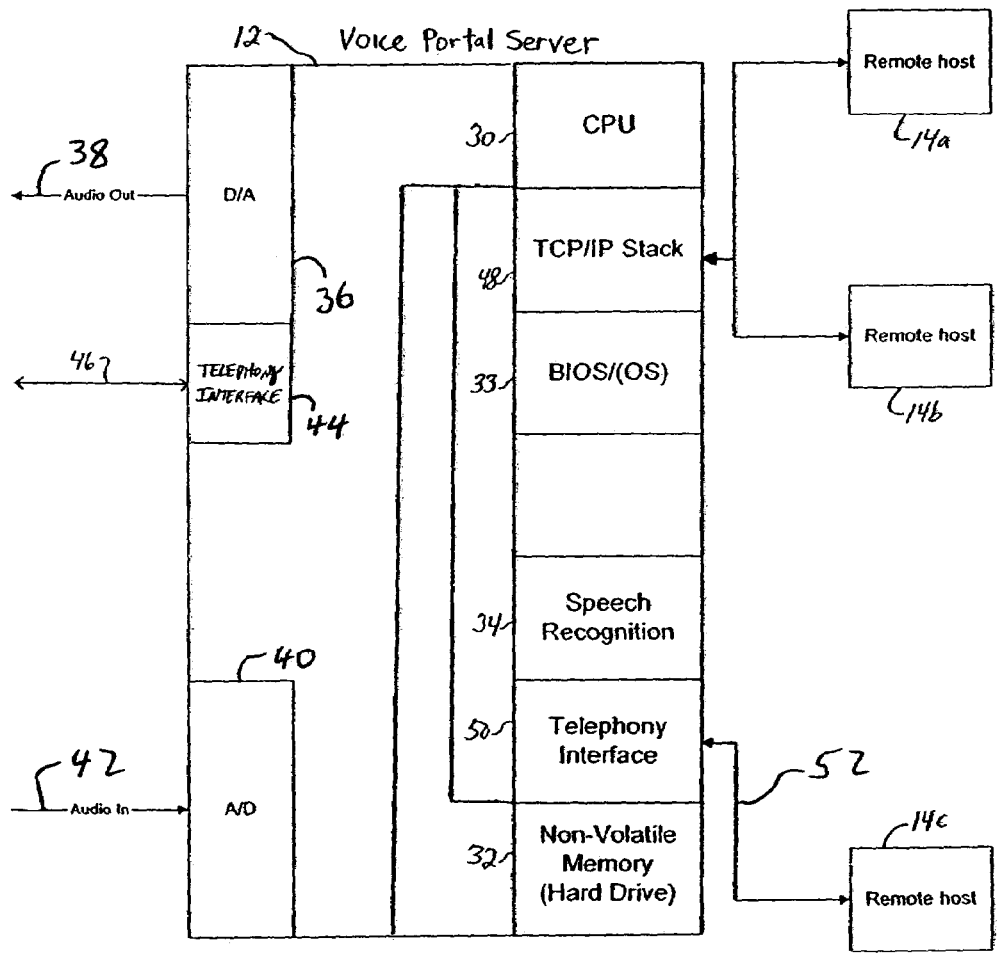
FIG. 2 is a block diagram of an embodiment of a voice portal server of the system of FIG. 1.

FIG. 2 shows a more detailed view of the voice portal server 12. The description of the server 12 herein is exemplary and not meant to be limiting. The voice portal server 12 includes a central processing unit (CPU) 30, a hard disk or drive 32 and a speech recognizer 34. The speech recognizer 34 can, however, reside on another computer such as server 14 at a remote location. The server 12 has one or more means for communicating with the user. In the preferred embodiment, the means for communicating includes a digital to analog (D/A) converter 36 with an audio output 38, and an analog to digital (A/D) converter 40 with an audio input 42. Alternatively, the means for communicating could consist of a telephony interface 44 and a telephone line 46. Any computer software used with server 12 can be stored on computer usable medium for storing data, such as, for example, a hard drive 32, floppy disks, magnetic tape, zip disks, CD-ROM, optical disks, or a combination of these.

The server can be coupled to one or more remote hosts 14a, 14b via voice over Internet Protocol (IP) or VoiceXML over Internet Protocol (IP) using an TCP/IP stack 48. Alternatively, the server could be coupled to a host 14c through a telephony interface 50 and a telephone line 52.

The memory resident on the server 12 can include, for example, ROM, RAM (SRAM and/or DRAM), Magnetic Optical and other non-volatile devices, BIOS 33, the operating system (OS), the speech recognition engine 34, the telephony interface 44, the TCP/IP stack 48 or the non-volatile memory 32. The speech recognition engine 34 can reside on another computer such as at a remote location.

Referring to FIGS. 1 and 2, a user interacts with a user interface provided by the voice portal server 12 and remote applications 26 using terminals such as telephone 18 and a mobile phone 20. The terminals 18 and 20 can be connected to the voice portal server 12 via a public network such as the PSTN or a private voice/data network. The terminals can also be connected to the voice portal server 12 via a wireless network connection 24 such as an analog, digital or pcs network using radio or optical communications media. In addition, the terminals 18 and 20, the voice portal server 12, the computer 25 and the remote application server 14 can all be connected to communicate with each other via a common wired or wireless communication medium, such as for example a voice over IP ("VoIP") network.

Preferably in the first embodiment, the browser stores a representation of the user's responses as, for example, the text string that was returned by the speech recognizer 34 or a specific VoiceXML grammar identification. To later "replay" the responses, they are supplied directly to the internal parser or to the VoiceXML interpreter, thus bypassing the speech recognizer. This implementation has several advantages: In particular, it's faster and uses less processing resources from CPU 30 because no voice recognition is necessary; it also avoids the problem that the speech recognizer 30 could return a different result when an audio file is replayed. This embodiment, however, requires the server 12 to be able to bypass the speech recognizer 34 and thus may not be possible in system architectures that use a voice recognizer on the remote server 14.

In some instances of the first embodiment of the invention, the speech recognizer 34 cannot be bypassed. When the speech recognizer 34 cannot be bypassed but is accessed via some non-analogue connection (e.g. using VoIP, or if the speech recognizer is on the remote server), the server 12 may transmit data through network 16. Transmitting the data through network 16 solves some of the problems in not bypassing the speech recognizer 34: VoIP data may be transmitted faster than a voice file can be played in realtime, avoiding much of the delay, although there will still be extra delay for speech recognition and the corresponding CPU overhead. In this variation, the speech recognizer 34 will more likely return consistent results because the audio is sent digitally.

In a variation of the first embodiment of the invention, to provide a user with access to a defined bookmark, a voice browser can store a recording, rather than textual recognition results, as a representation of the user's voice input that the user provided to the voice application. The recording of each of the user's voice inputs are then "replayed" to the speech recognizer in response to the voice applications prompts when the bookmark is accessed. This embodiment can be implemented under a wide variety of connection architectures between the browser, the speech recognizer 34, a voice code interpreter such as a VoiceXML interpreter, and the communication means for both the remote server and the user.

Bookmarks can also be used for information sources that involve the transfer of a call from a PBX extension to another telephone network, also known as tromboning. In some ways it will be easier to determine the start of a tromboned bookmark because the transfer point is well defined because the server 12 will know precisely at what point in the application that the server dialed out to the telephone network. Some information sources may only be available using tromboning, and the ability to make bookmarks across different types of voice applications can make the user interface more uniform.

Figure 3:
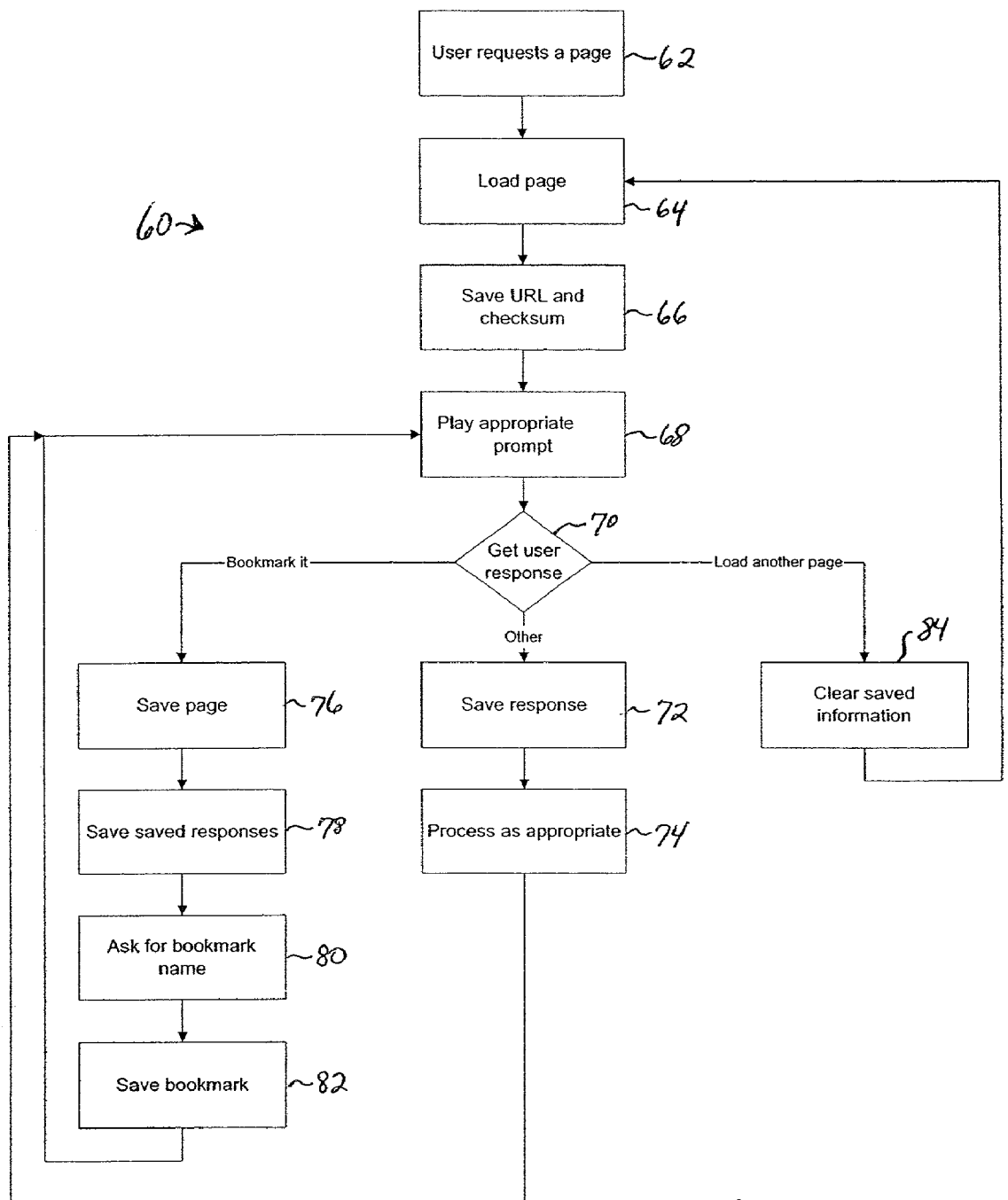
FIG. 3 is a flowchart showing an exemplary method of creating a bookmark in a voice application using the system of FIG. 1.

FIG. 3 shows method 60 for creating a bookmark using the first embodiment of the invention. Once a user logs onto the server 12, at 62 the user requests access to a voice application or a page from a voice application. The user can request the voice application by a voice command used with the server or by other means. At 64, the server 12 loads the voice application page that the user requested, by, for example, connecting to the remote application server 14. At 66, the server 12 can save the URL of the voice application page in memory (such as RAM or on hard drive 32 or some other data storage device) so that it can access and save the URL as part of a bookmark if the user should make a request to create one. At 68, the server 12 plays a prompt from the voice application to the user. At 70, the server 12 obtains a response from the user. At 72, if the user didn't indicate that he wanted to create a bookmark or go to another voice page the server 12 saves the user's response in memory (such as RAM or on hard drive 32 or in some other data storage device). At 74, the voice application processes the response from the user as appropriate, which can include playing to the user another prompt at 68.

At 70, if the user's response indicates that the user wants to create a bookmark, at 76 the server saves as part of the bookmark the URL of the page. At 78, the server 12 saves as part of the bookmark the user's responses that were saved at 72. At 80, the server 12 asks the user for a bookmark name. At 82, the server 12 creates and saves a bookmark with the information obtained at 76, 78 and 80, namely the URL of the bookmark of page, the user's saved responses and the bookmark name. At 68, the server plays to the user the next appropriate prompt in the voice application.

If at 70, the user indicates that he would like to go to another voice application page, at 84 the server clears the information saved in memory or allows the information to be overwritten when the user is at the next voice application page and loads the other voice application page. The information that is cleared from memory can include the user's saved responses obtained at 72 and the URL and checksum saved at 66.

Figure 9:
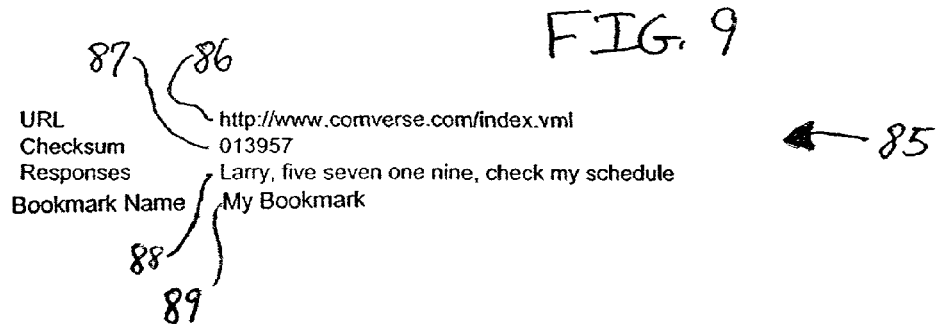
FIG. 9 is an exemplary data structure of a saved bookmark used with the system of FIG. 1.

FIG. 9 shows an exemplary data structure of a bookmark 85 that can be created using the method of FIG. 3. The bookmark 85 can include a URL 86, a checksum 87, one or more responses 88 that the user provided to the voice application while at the URL 86 and the name 89 that the user gave the bookmark.

Figure 4:
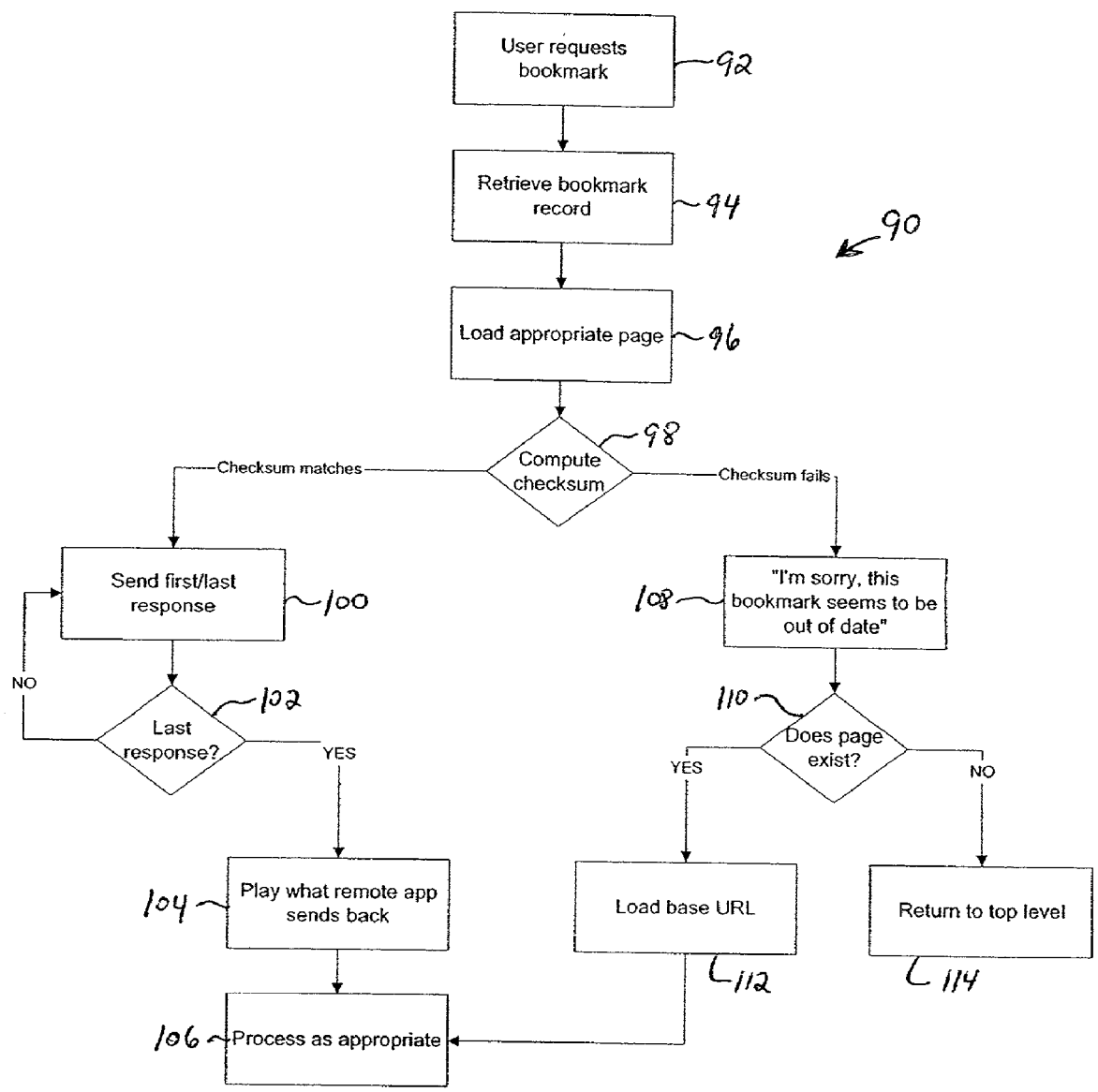
FIG. 4 is a flowchart showing an exemplary method of using a bookmark using the system of FIG. 1.

FIG. 4 shows an exemplary method 90 of using a bookmark such as the one created in FIG. 3. At 92, the user requests the system 12 to use a specific bookmark. The user can select a specific bookmark by stating the name of the bookmark and an associated command recognized by server 12. At 94, the server 12 retrieves the bookmark from where it is stored, preferably on hard drive 32. At 96, the server 12 loads the user requested voice page from the remote server 14.

At 98, the server computes the checksum of the loaded voice page and compares the checksum with a checksum previously stored for that page to see if the content of the page has changed. If the comparison at 98 of the current checksum and previously obtained checksum for that page show that they are the same, the server 12 assumes that content of the page has remained unchanged. At 100, the server replays a representation of one of the user's responses 88 from the bookmark 85 in response to one of the voice page's prompts. After each of the responses is replayed, the server 12 determines at 102 if that was the last response to replay. If not, the server replays the next response at 100. When the server has replayed the last response, at 104 the server 12 has reached the bookmarked location or substantially thereabout and plays to the user what the remote application 26 transmits to the server 12. For example, the remote application 26 may play the user's horoscope as in the above example and may play an introduction such as "Here is your horoscope." At 106, the server 12 continues to process normally through the voice page.

If the comparison at 98 of the current checksum and previously obtained checksum for that page show that they are different (i.e., indicating a possible "broken" bookmark), then at 108, the server can provide a message to the user, such as "I'm sorry, this bookmark seems to be out of date." Other methods of dealing with a "broken" bookmark are described below. At 110, the server 12 can determine if the voice page still exists. If the voice page does exist, then the server can load the base URL 112 and play the voice page from the beginning. At 106, the server 12 continues to process normally through the voice page.

If at 110, the server 12 determines that the voice page does not exist, the server 12 at 114 can return to a top level of an application running on the server 12 or can return to where the voice page where the user was prior to requesting the bookmark.

In a second embodiment of the invention, the bookmarking is performed with the cooperation of the voice code interpreter. At the point where the user desires to place the bookmark, server 12 may save the voice code interpreter's internal state, which can include the interpreter's variable settings and properties, within the interpretation of the current document. The server 12 may save the interpreter's internal state, for example, by writing a new voice code document that reflects the original document but includes only the necessary internal state information in voice code format. Such a saved document, when executed, would recreate the state at the point of the bookmark with no special state handling required.

In the second embodiment, the voice code interpreter "understands" the document and, upon resuming, can continue to fill in still-missing fields with the proper prompt sequences. This embodiment can be used with architectures in which some higher-level language is being interpreted locally, such as with VoiceXML, so that the local interpreter can create bookmarks without cooperation from the remote application 26.

Figure 5:
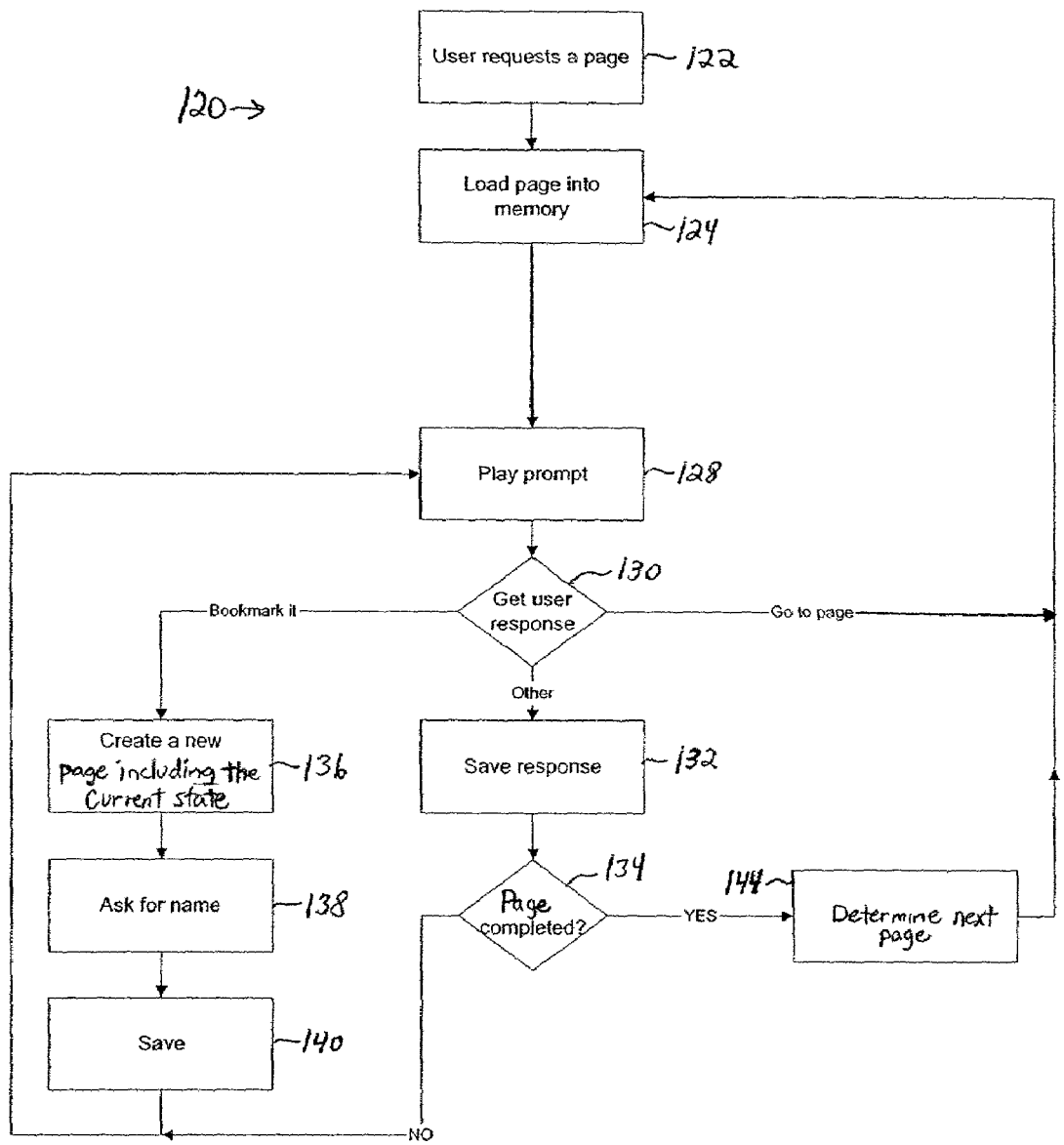
FIG. 5 is a flowchart showing an exemplary method of saving a voice page bookmark using the system of FIG. 1.

FIG. 5 shows an exemplary method 120 for creating a voice page bookmark using the second embodiment of the invention. Once a user logs onto the server 12, at 122 a user requests access to a voice application or a page from a voice application. The user can request the voice application by a voice command previously programmed with the server 12. At 124, the server 12 loads the voice application page that the user requested connecting to the remote application server 14. At 128, the server 12 plays the first prompt of the voice application to the user. At 130, the server 12 obtains a response from the user. At 132, the server 12 saves the user's response in memory (such as RAM or hard drive 32 or in some other data storage device). At 134, the server determines if the page has been completed. If the server 12 determines that the user has not completed the page at 128, the server can play to the user another prompt from the application. If the server 12 determines that the user has completed the voice page, at 144, the server 12 determines the next page to load into memory again at 124.

At 130, if the user's response indicates that the user wants to create a bookmark, at 136 the server creates and saves a new voice page, such as a VoiceXML page, with all the current fields filled in such that the user's responses and preferably all state information would be included. At 138, the server 12 asks the user for a bookmark name. At 140, the server 12 saves in memory the bookmark with the information obtained at 136 and 138, namely the bookmark page, the new voice page with all the current fields filled in and the bookmark name. At 128, the server plays to the user the next appropriate prompt in the voice application.

If at 130, the user indicates that he would like to go to another voice application page, at 124 the server loads the other voice application page. The information cleared from memory can include the user's saved responses obtained at 132 and the URL and checksum saved at 126.

Figure 10:
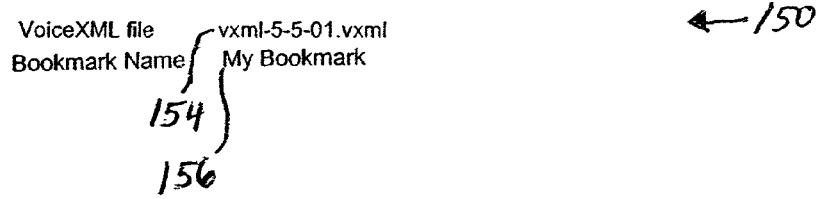
FIG. 10 is an exemplary saved VoiceXML data structure used with the system of FIG 1.

FIG. 10 shows an exemplary data structure of a bookmark 150 that can be created using the method of FIG. 5. The bookmark 150 can include a filename 154 of a file containing the code of the voice application and the name 156 that the user gave the bookmark. The filename 154 shown in FIG. 10 has a .vxml extension and as such the associated file is stored in a VoiceXML format.

Figure 6:
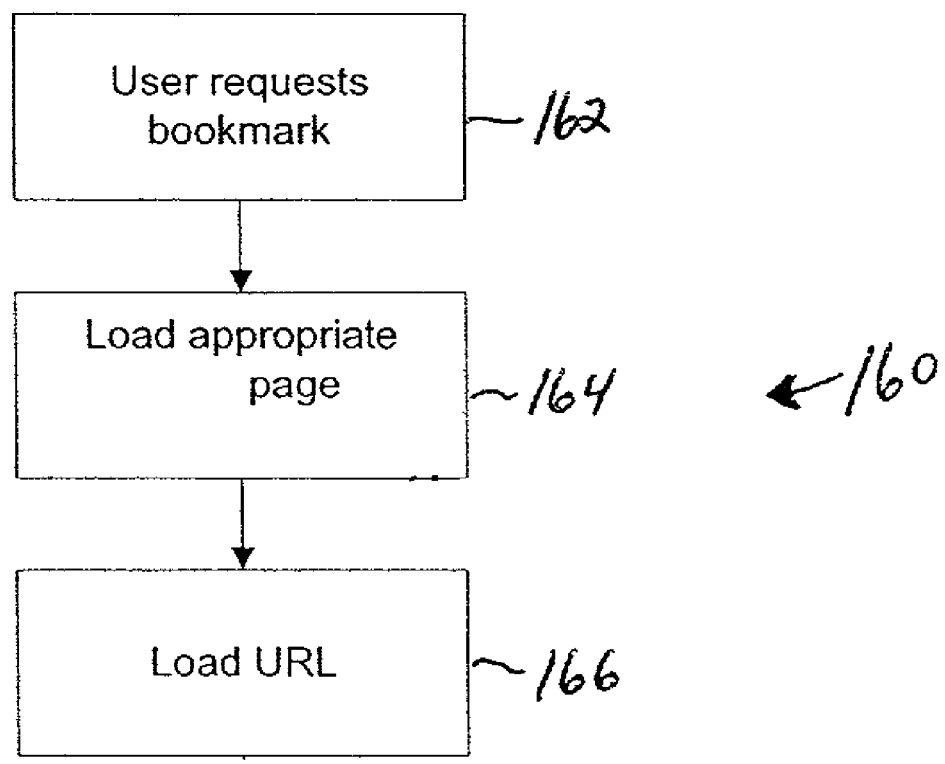
FIG. 6 is a flowchart showing an exemplary method of using a saved voice page bookmark using the system of FIG. 1.

FIG. 6 shows an exemplary method 160 of using a voice page bookmark such as the one created in FIG. 5. At 162, the user requests the system 12 to use a specific bookmark. The user can select a specific bookmark by stating the name of the bookmark and an associated command recognized by server 12. At 164, the server 12 loads the user requested voice page from memory (such as, RAM or on the hard drive 32 of server 12 or another data storage device). A representation of the voice application page can be obtained by loading the file having filename 154 in bookmark 150. This representation can include the prompts from voice application 26 (or a representation thereof) and possibly, but not necessarily, a representation of the user's responses. At 166, the server 12 processes the saved voice page as normal.

Figure 7:
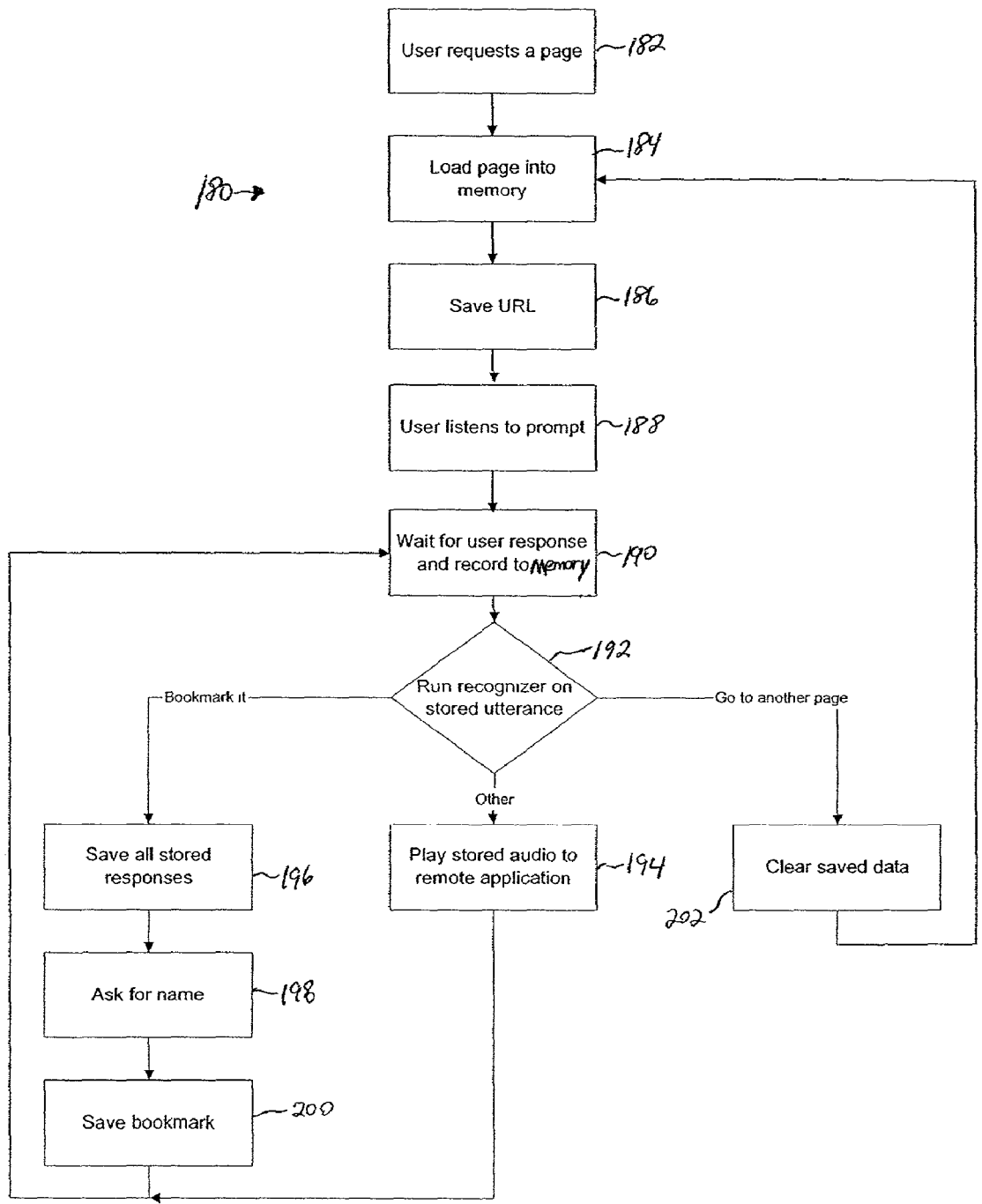
FIG. 7 is a flowchart showing an exemplary method of saving an audio bookmark using the system of FIG. 1.
Figure 8:
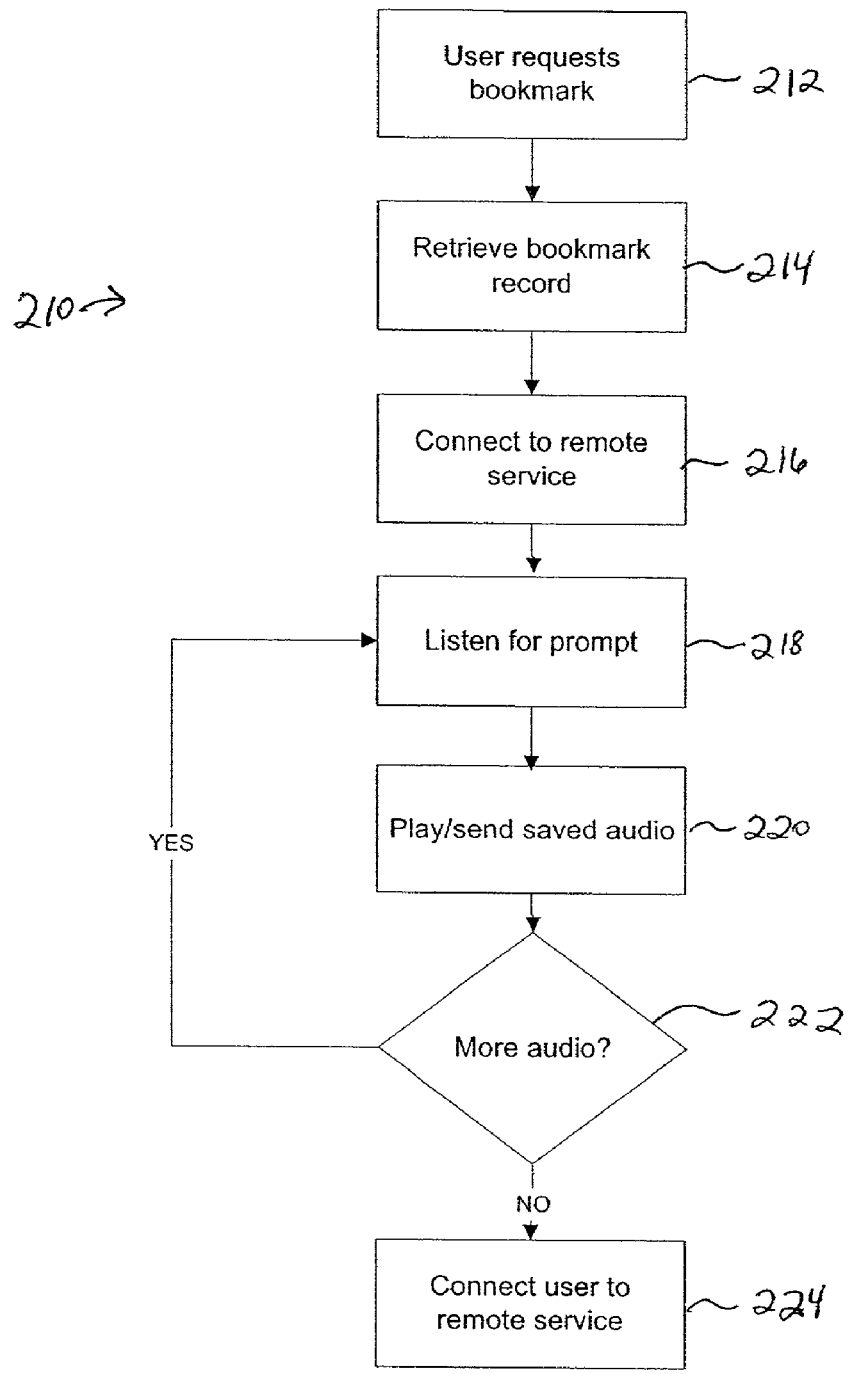
FIG. 8 is a flowchart showing an exemplary method of using a saved audio bookmark using the system of FIG. 1.

FIGS. 7 and 8 show a variation of the first embodiment of the invention in which saved audio, rather than textual recognition results, is stored and transmitted to the host 14 using, for example, tromboning or VoIP. Referring to FIG. 7, once a user logs onto the server 12, at 182 a user requests access to a voice application or a page from a voice application. At 184, the server 12 connects to the remote application server 14 and loads the voice application page that the user requested. At 186, the server 12 can save the URL of the voice application page on hard drive 32 so that it can save the URL as part of a bookmark if the user should make a request to create one at that URL. At 188, the server 12 plays the first prompt of the voice application to the user so that the user can listen to the prompt. At 190, the server 12 waits for the user to respond, obtains a response from the user and saves the user's response in memory (such as RAM (DRAM and/or SRAM) on hard drive 32 or in some other data storage device). At 192, the server runs the speech recognizer 34 on the user's response. At 194, if the user did not request to create a bookmark or go to another page, at 194, the user's response is then played to the voice application 26. The server then at 190 waits for another response from the user.

If at 192, the user's response indicates that the user wants to create a bookmark, at 196 the server saves all stored responses that were saved at 196 with the bookmark. At 198, the server 12 asks the user for a bookmark name. At 200, the server 12 saves in memory the bookmark with the information obtained at 196 and 198, namely the voice page URL, the user's saved responses and the bookmark name. The checksum of the voice page can also be saved with the bookmark. At 190, the server 12 waits for the user to provide the next response to the voice application.

If at 192, the user indicates that he would like to go to another voice application page, at 202 the server 12 clears the information saved in memory or allows the information to be overwritten when the user is at the next voice application page and loads the other voice application page. The saved information cleared from memory can include the user's saved responses obtained at 190 and the URL saved at 186 and also the checksum if one was saved.

Figure 11:
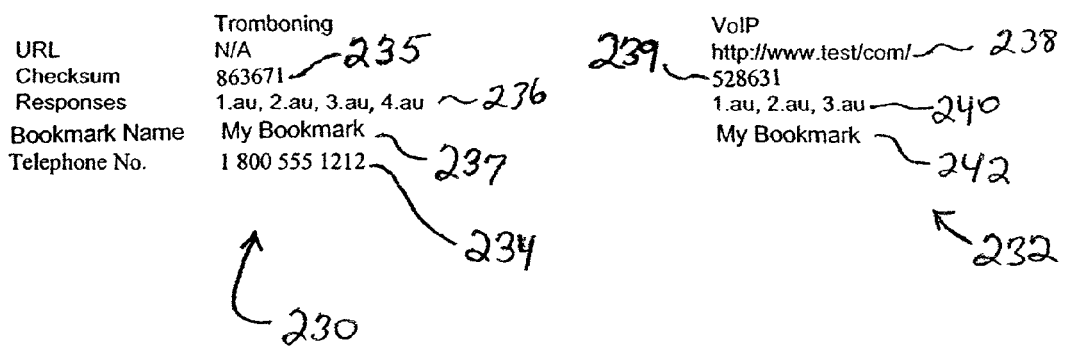
FIG. 11 is an exemplary saved audio data structure used with the system of FIG. 1.

FIG. 11 shows some exemplary data structures of bookmarks 230 and 232 for tromboning and VoIP, respectively, using the method of FIG. 7. The bookmark 230 used for tromboning configurations can include filenames 236 of audio files having the user's responses, a phone number 234 used to transfer the network connection, a checksum 235 and a name 237 that the user gave the bookmark. The bookmark 232 used for VoIP configurations can include filenames 240 of audio files having the user's responses, the URL 238 of the voice page, a checksum 239 and a name 242 that the user gave the bookmark.

FIG. 8 shows an exemplary method 210 for using a bookmark for saved audio files such as the bookmark obtained using the method of FIG. 7. At 212, the user requests the system 12 to use a specific bookmark. At 214, the server 12 retrieves the bookmark from where it is stored, preferably on hard drive 32. At 216, the server 12 connects to the remote server 14 using, for example, tromboning or VoIP. The server 12 loads the user requested voice page from the remote server 14. At 218, the server waits for the prompt from the remote server 14 and plays the appropriate saved audio segment at 220. The system then determines at 222 if more audio responses exist and plays them in response to the prompts transmitted from remote server 14. When server 12 determines at 222 that no more audio segments exist, at 224, the server 12 connects to the remote service 14 at the bookmarked location or substantially thereabout.

The invention can be applied to any architecture in which a local browser or recognition server receives and processes recognition grammars from a remote application, regardless of the structure or implementation paradigm of that remote application.

When the user accesses a bookmark, the system preferably replays the saved responses as quickly as possible and then lets the user hear everything after the final response. In the example above, after accessing the bookmark the user actually hears "Your sign is Sagittarius. Here is your horoscope . . . " It may be more desirable to have the user hear only "Here is your horoscope . . . " Unfortunately, in typical applications it may be difficult to know the semantics of the pieces of a prompt string, and so it may not be possible to break it down. This is one benefit of the saving the voice page bookmark with the second embodiment of the invention. When making the bookmark, the system knows which prompts have been played and can incorporate this information into the interpreter generated bookmark file.

In the original dialogue, the user may have made mistakes. For example, the dialogue may have proceeded like this:

| | |
|---|---|
| Horoscope Service: | "Please say your birth month." |
| User: | "Uh, December" |
| Horoscope Service: | "I didn't understand that. Please say your birth month." |
| User: | "December" |
| Horoscope Service: | "On what day in December were you born?" |
| User: | "6" |

| | |
|---|---|
| -continued | |
| Horoscope Service: | "Your sign is Sagittarius. Here is your horoscope for today." |

The user's mistake does not cause a problem when creating and using a bookmark; any such mistakes will simply be replayed each time the user accesses the bookmark, but the user will not hear the dialogue containing the error.

If the remote application 26 uses VoiceXML, a complex application can span several "pages" with distinct URLs. In accordance with an embodiment of the invention, when the VoiceXML or a similar language is being saved, it is adequate to store only the responses starting with the current page. Alternatively and in accordance with another embodiment of the invention, it may be necessary to store and replay all responses starting with the beginning of the application (the root page), since application context is carried from page to page. The extent to which more than one page will depend upon the context and the structure of the remote application.

In the case of a web browser, bookmarks can "break," that is, accessing the bookmark may lead to a different page than expected, or may lead nowhere. This may also occur with voice browser bookmarks. If the saved URL cannot be accessed, the browser can play to the user a message to that effect. However, it can happen that the saved URL still leads to a VoiceXML application, but a different application. The saved responses may no longer be understood by the new application, which may expect responses in a different order (or may be looking for something else entirely).

In accordance with embodiments of the invention, there are several ways to ameliorate this problem of a broken bookmark. One method is to detect if the voice application page has changed since it was last accessed, either by a textual compare of the entire page or by comparing a checksum of the page. If the server 12 detects a change in the page, it can report a broken bookmark to the user by providing the user with a notification to that effect.

However, a textual or checksum comparison may report valid bookmarks as broken, since the changes in the page may not affect its callflow. As an alternative method, the server can store with the bookmark a checksum or other representation of each grammar and prompt that was encountered, and when the bookmark is accessed, the server 12 can verify that the callflow is unchanged. In this context, see also related patent application entitled "Method and System for Modifying the Behavior of an Application Based Upon the Application's Grammer," which has an Ser. No. 10/066,154, regarding taking actions based on externally-supplied grammars.

When the server 12 detects the problem of a broken bookmark, there are several actions that the server 12 can perform. The server 12 can simply play to the user "sorry, this bookmark is broken." Alternatively, if some of the responses that are provided by the server 12 work, the server 12 can use that portion of the sequence and restart partway through the bookmark, playing some explanatory prompt to the user. In this case, the server 12 can permit the user to hear the prompts and the stored responses, so that the user knows what has gone wrong.

In accordance with the second embodiment of the invention in which some or part of the bookmarked page is saved, the problem of a broken bookmark is lessened. The bookmarked page is valid because it was created by the interpreter and is not actually a page from the application. Other pages from the voice application 26 may have changed, and thus the links on the bookmarked page may be invalid, but in the horoscope example, the correct horoscope would be played provided the horoscope files themselves have not changed.

One or more distinct bookmarks can be placed within the same voice application, which can be a VoiceXML application. For example, it is quite reasonable for the user to re-access the Horoscope Service (as the user did originally, not via a bookmark), to give a different set of responses, e.g. his wife's birthdate, and to set another bookmark. He now has two bookmarks that access the Horoscope Service's VoiceXML application, but at different "places" within it.

The techniques described herein can also be used for other forms of navigation within voice applications, including VoiceXML applications. For example, the typical "back" command of a web browser could be implemented in a voice browser with a queue of saved interactions, including all responses. When the user says "back" the browser searches back through the saved interactions to find one that started in a known and recreateable state (e.g., first visit to a new URL). It then recreates that state and replays user responses up to the point to which the user desires to return. In the second embodiment of the invention, the interpreter can save the current page each time it transitions to a new page and save the bookmark page in a "back stack." When the user says "back," the previous page is recalled from the stack and is in the same state as when the user transitioned.

It may also be necessary for the server 12 to record the timing of the user's input to the server 12. For example, the user may have "barged-in" on the prompt by speaking too quickly in response to a question of the voice application 26, or he may have waited for the prompt to finish. If the voice application 26 was told whether or not barge-in occurred, then the bookmark may have to record when and if the user's response or "barge-in" occurred so that the server 12 can correctly recreate the situation when the bookmark is accessed. Similarly, if on a barge-in the application is told how much of the voice application's prompt has played when the barge-in occurred, it may be necessary to store whatever was reported. The voice application 26 can learn how much of the prompt had been played at the point of barge-in by prompting the user to speak in response to a correct or incorrect answer. For example, the server 12 can use a technique such as this: "Please say 'stop' when you hear the correct city: Boston, New York, London, . . . " In this example, it would be preferable for the server 12 to save the delay amount of the user's response with the bookmark so that this delay can be recalled when the bookmark is used so that the same city is accessed.

In another embodiment of the invention, voice macros, which are analogous to the keyboard macros available in text systems such as Word and Emacs, can be used to create a bookmark. The server can wrap up a set of user responses and give it a name. Subsequent activation of that macro name transmits the whole sequence of responses, rapidly. The embodiment can include "voice macros with input," in which the sequence includes "holes," namely points where a browser pauses for a user response that was not recorded as part of the sequence. Both the start and stop of a voice macro may need to be specified for a voice macro such that it can function as a bookmark.

With some architectures it may also be possible and desirable to permit the user to hear the replayed commands, possibly sped up or with silences removed.

In some instances, it may be undesirable to simply replay a sequence of responses, because at the time those responses were recorded they may have had a result that cannot be repeated. For example:

| | |
|---|---|
| User: | Access the voice dialing application |
| System: | What would you like to do? |
| User: | Delete John Doe. |
| System: | Deleting John Doe, OK? |
| User: | OK. |
| System: | John Doe deleted. What now? |
| User: | Look up Richard Roe. |
| System: | Richard Roe's home number is 555-1212, . . . |
| User: | Bookmark this. |

The user may expect that he has just created a bookmark to hear Richard Roe's information. But in fact the bookmark won't work, because the next time the user attempts to use the bookmark, the deletion of John Doe may fail. To resolve this, the server 14 could start the bookmark at a later point in the application if the server is able detect the error. Alternatively, the server 12 could start the bookmark at the same place in the application, but provide the user with the option of moving to a later point in the voice application.

These bookmarks could be used in conjunction with the invention described in the patent application having Ser. No. 10/066,154, entitled "Method and System for Modifying the Behavior of an Application Based Upon the Application's Grammer." In this embodiment, a voice bookmark could consist not only of input the user provided, but also of something the browser interprets for the user. For example, if the voice application says "What's your credit card number" and the user says "Hey, Tel@GO, use my VISA," the server 12 can send the voice application a VISA number that the user didn't say. In fact, it is possible that the user may never have spoken the VISA number to server 12 if the server generated the response based on a text representation of the VISA number stored on the Server 12. If the user then says "bookmark it," the full interaction would be saved and replayed as though the user had given the credit card number.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed:

1. A method for providing a bookmark in a voice application, the method comprising:
    presenting the voice application to a user;
    allowing the user to access the voice application and provide vocal input to the voice application;
    creating, upon a user request, a bookmark to a location in the voice application in accordance with vocal input provided to the voice application, wherein the creating includes saving a pointer to the voice application, and saving a representation of vocal input by the user to the voice application up to the bookmarked location in the voice application; and
    providing the user with repeatable access to the bookmark in the voice application in order to return to the bookmarked location.

2. A method according to claim 1, wherein providing the user with access to the bookmark location of the voice application comprises:
    using said pointer to access the voice application; and
    replaying the representation of the interactions to progress through the voice application substantially up to the bookmarked location.

3. A method according to claim 1 wherein the voice application includes VoiceXML code.

4. A method according to claim 1, wherein creating, upon user request, a bookmark to a location in the voice application comprises:
    saving a modified representation of a page of the voice application.

5. A method according to claim 4, wherein providing the user with access to the bookmark location of the voice application comprises:
    executing the modified representation of the voice application.

6. A method according to claim 4, wherein the voice application includes VoiceXML code.

7. A method according to claim 4, wherein the modified representation of the voice
    application includes VoiceXML code.

8. A method according to claim 1, further comprising:
    obtaining and saving a first checksum of the voice application when the bookmark is created;
    obtaining a second checksum of the voice application when the voice application is accessed using the bookmark; and
    comparing the first and the second checksums to determine if the content of the voice application has changed.

9. An apparatus for providing a user access to a voice application through a computer network, comprising:
    a server coupled to the computer network, wherein the server has a processor that is programmed to:
    allow a user to access the voice application and provide vocal input to the voice application;
    create, upon a user request, a bookmark to a location in the voice application in accordance with vocal input provided to the voice application, wherein the bookmark includes a pointer to the voice application, and a representation of vocal input by the user to the voice application up to the bookmarked location in the voice application; and
    provide the user with repeatable access to the bookmark in the voice application in order to return to the bookmarked location.

10. An apparatus of claim 9, further comprising a speech processing device coupled to the processor.

11. An apparatus of claim 9, further comprising an analog to digital converter coupled to the processor, wherein the analog to digital device has an audio input for receiving an analog audio signal from the user.

12. An apparatus of claim 9, further comprising a digital to analog converter coupled to the processor, wherein the digital to analog device has an audio output for sending an analog audio signal to the user.

13. An apparatus of claim 9, further comprising a telephony interface coupled to the processor for sending and receiving audio signals to the user.

14. An apparatus of claim 9, wherein the voice application resides on a remote host, further comprising a telephony interface coupled to the processor for transmitting and receiving audio signals to and from the remote host, respectively.

15. An apparatus of claim 9, wherein the voice application resides on a remote host, further comprising a TCP/IP stack coupled with the network and the processor, the TCP/IP stack for transmitting and receiving data to and from the remote host, respectively.

16. An apparatus for providing a user access to a voice application through a computer network, comprising:
a server coupled to the computer network, the server including:
a processor and associated memory;
a speech processing device coupled to the processor;
communication means coupled to the processor for receiving and sending analog audio signals to and from the user, respectively; and
network interface means for transmitting and receiving signals to and from a voice application on a remote host, respectively;
wherein the processor includes:
means for allowing a user to access the voice application through the communication means and the network interface means and provide vocal input to the voice application;
means for creating, upon a user request, a bookmark to a location in the voice application in accordance with vocal input provided to the voice application, wherein the means for creating includes means for saving a pointer to the voice application, and means for saving a representation of vocal input by the user to the voice application up to the bookmarked location in the voice application; and
means for providing the user with repeatable access to the bookmark in the voice application in order to return to the bookmarked location.

17. An apparatus of claim 16, further comprising means for storing one or more bookmarks of the user.

18. An apparatus of claim 17, wherein the means for storing includes random access memory.

19. An apparatus of claim 17, wherein the means for storing includes a magnetic data storage medium.

20. An apparatus of claim 17, wherein the means for storing includes an optical data storage.

21. A system for providing a user access to a voice application through a computer network, comprising:
a voice portal server coupled to the computer network, the server including:
a processor;
a speech processing device coupled to the processor;
communication means coupled to the processor for receiving and sending analog audio signals to and from the user, respectively; and
network interface means for transmitting and receiving signals to and from a voice application on a remote host, respectively;
wherein the processor is programmed to:
allow a user to access the voice application through the communication means and the network interface means and provide vocal input to the voice application;
create, upon a user request, a bookmark to a location in the voice application in accordance with vocal input provided to the voice application, wherein the bookmark includes a pointer to the voice application, and a representation of vocal input by the user to the voice application up to the bookmarked location in the voice application; and
provide the user with repeatable access to the bookmark in the voice application in order to return to the bookmarked location; and
an application server having the voice application.

22. An article of manufacture, comprising:
a computer usable medium having computer readable program code means embodied therein for providing a bookmark in a voice application, the computer readable program code means in said article of manufacture comprising:
computer readable program code means for causing the computer system to allow a user to access the voice application and provide vocal input to the voice application;
computer readable program code means for causing the computer system to create, upon a user request, a bookmark to a location in the voice application in accordance with vocal input provided to the voice application, wherein the means for causing the computer system to create a bookmark includes means for causing the computer system to save a pointer to the voice application, and means for causing the computer system to save a representation of vocal input by the user to the voice application up to the bookmarked location in the voice application; and
computer readable program code means for causing the computer system to provide the user with repeatable access to the bookmark in the voice application in order to return to the bookmarked location.

23. The article of manufacture of claim 22, wherein the computer readable program code means for causing the computer system to provide the user with access to the bookmark location of the voice application comprises:
computer readable program code means for causing the computer system to use said pointer to accessing the voice application;
computer readable program code means for causing the computer system to replay the saved representation of the interactions to progress through the voice application substantially up to the bookmarked location; and
computer readable program code means for causing the computer system to provide the user with access to the bookmarked location in the voice application.

24. The article of manufacture of claim 22, wherein the computer readable program code means for causing the computer system to create, upon user request, a bookmark to a location in the voice application comprises
computer readable program code means for causing the computer system to save a modified representation of the voice application that includes substantially all results of the vocal inputs up to the bookmarked location.

25. The article of manufacture of claim 24, wherein the computer readable program code means for causing the computer system to provide the user with access to the bookmark location of the voice application comprises computer readable program code means for causing the computer system to execute the modified representation of the voice application.

26. The article of manufacture of claim 22, wherein the computer readable program code means in said article of manufacture further comprises:
computer readable program code means for causing the computer system to obtain and save a first checksum of the voice application when the bookmark is created;
computer readable program code means for causing the computer system to obtain a second checksum of the voice application when the voice application is accessed using the bookmark; and computer readable program code means for causing the computer system to compare the first and the second checksums to determine if the content of the voice application has changed.

27. A method for providing a bookmark in a voice application, the method comprising:
    allowing a user to request a page of the voice application;
    loading the page of the application;
    saving a URL and a checksum of the page;
    providing to the user a prompt of the page;
    obtaining a voice response from the user;
    saving the response from the user;
    processing the response from the user;
    creating the bookmark to the page of the voice application if the voice response of the user through the voice application indicates that the user desires to create the bookmark to the page, wherein creating the bookmark includes:
        saving a pointer to the voice application;
        saving a representation of vocal input by the user to the voice application up to the bookmarked location in the voice application;
        requesting from the user a name for the bookmark; and
        saving the bookmark including the name of the bookmark, one or more responses that the user provided for the page of the application, the URL and the checksum of the application; and
    accessing, by the user, the page of the voice application using the bookmark after saving the bookmark.

28. The method of claim 27, further comprising clearing saved information and loading another page if the response of the user indicates that the user desires to load another page.

29. An apparatus for providing a user access to a voice application through a computer network, comprising:
    a server coupled to the computer network, wherein the server includes:
        means for allowing a user to request a page of the voice application;
        means for loading the page of the application;
        means for saving a URL and a checksum of the page;
        means for providing to the user a prompt of the page;
        means for obtaining a voice response from the user;
        means for saving the response from the user;
        means for processing the response from the user;
        means for creating the bookmark to the page of the voice application if the voice response of the user through the voice application indicates that the user desires to create the bookmark to the page, said means for creating the bookmark including:
            means for saving a pointer to the voice application;
            means for saving a representation of vocal input by the user to the voice application up to the bookmarked location in the voice application;
            means for requesting from the user a name for the bookmark; and
            means for saving the bookmark including the name of the bookmark, one or more responses that the user provided for the page of the application, the URL and the checksum of the page; and
        means for accessing the page of the voice application by using the bookmark after saving the bookmark.

30. The apparatus of claim 29, wherein the server further comprises means for clearing saved information and loading another page if the response of the user indicates that the user desires to load another page.

31. A method for providing a bookmark in a voice application, the method comprising:
    allowing a user to request a page of the voice application;
    loading the page of the application;
    saving a checksum of the page;
    provide to the user a prompt of the page;
    obtain a voice response from the user;
    saving the response from the user;
    processing the response from the user; and
    creating the bookmark to the page of the voice application if the voice response of the user through the voice application indicates that the user desires to create the bookmark to the page, wherein creating the bookmark includes:
        saving a modified representation of the voice application that includes substantially all results of the vocal inputs up to the bookmarked location;
        requesting from the user a name for the bookmark;
        saving the bookmark including the name of the bookmark and a reference to the modified representation of the voice application; and
    accessing, by the user, the page of the voice application by using the bookmark after saving the bookmark.

32. The method of claim 31, further comprising loading another page if the response of the user indicates that the user desires to load another page.

33. An apparatus for providing a user access to a voice application through a computer network, comprising:
    a server coupled to the computer network, wherein the server includes:
        means for allowing a user to request a page of the voice application;
        means for loading the page of the application;
        means for saving a checksum of the page;
        means for providing to the user a prompt of the page;
        means for obtaining a voice response from the user;
        means for saving the response from the user;
        means for processing the response from the user;
        means for creating the bookmark to the page of the voice application if the voice response of the user through the voice application indicates that the user desires to create the bookmark to the page, wherein the means for creating the bookmark includes:
            means for saving a modified representation of the voice application that includes substantially all results of the vocal inputs up to the bookmarked location;
            means for requesting from the user a name for the bookmark; and
            saving the bookmark including the name of the bookmark, a reference to the modified representation of the voice application and the checksum of the page; and
        means for accessing the page of the voice application by using the bookmark after saving the bookmark.

34. The apparatus of claim 33, wherein the server further comprises means for clearing saved information and loading another page if the response of the user indicates that the user desires to load another page.

* * * * *